United States Patent [19]
Zur

[11] Patent Number: 4,856,956
[45] Date of Patent: Aug. 15, 1989

[54] CONTAINER EXTRACTION AND TRANSFER MECHANISM FOR AN AUTOMATED STORAGE AND RETRIEVAL SYSTEM

[75] Inventor: Joseph G. Zur, Piscataway, N.J.
[73] Assignee: Supac Systems, Inc., Piscataway, N.J.
[21] Appl. No.: 231,657
[22] Filed: Aug. 12, 1988

Related U.S. Application Data

[63] Continuation-in-part of Ser. No. 63,388, Jun. 18, 1987, abandoned.
[51] Int. Cl.⁴ ............................................. B65G 1/02
[52] U.S. Cl. ................................. 414/280; 198/627; 198/726; 414/281; 414/661
[58] Field of Search ............ 414/277, 661, 279–282, 414/618, 785, 751; 198/627, 726

[56] References Cited

U.S. PATENT DOCUMENTS

| | | | |
|---|---|---|---|
| 2,669,342 | 2/1954 | Neal | 198/726 X |
| 4,010,855 | 3/1977 | Smith | 414/280 X |
| 4,563,120 | 1/1986 | Josserand | 414/280 X |
| 4,601,388 | 7/1986 | Blümle | 198/726 |
| 4,656,949 | 4/1987 | Ragot | 414/280 X |
| 4,690,602 | 9/1987 | Castaldi et al. | 414/282 |
| 4,691,817 | 9/1987 | Haar | 414/751 X |
| 4,767,116 | 8/1988 | Eberle | 198/627 |

FOREIGN PATENT DOCUMENTS

| | | | |
|---|---|---|---|
| 1206268 | 2/1960 | France | 198/627 |
| 0981129 | 12/1982 | U.S.S.R. | 414/282 |

*Primary Examiner*—David A. Bucci
*Attorney, Agent, or Firm*—William C. Crutcher

[57] ABSTRACT

An extraction and transfer mechanism for modular containers in an automated storage and retrieval system of the type having a storage matrix of modular containers and a stacker crane with a vertically movable platform. The extraction and transfer mechanism is carried on the platform and when positioned adjacent a selected modular container, is arranged to extract the container from a first selected storage location laterally onto the platform, and to transfer the container in either lateral direction into a second selected empty storage location. The preferred embodiment uses a pair of continuous loop friction belt and collapsible hook assemblies, which both grasp and hook the sides of handleless modular containers for extraction and transfer.

11 Claims, 7 Drawing Sheets

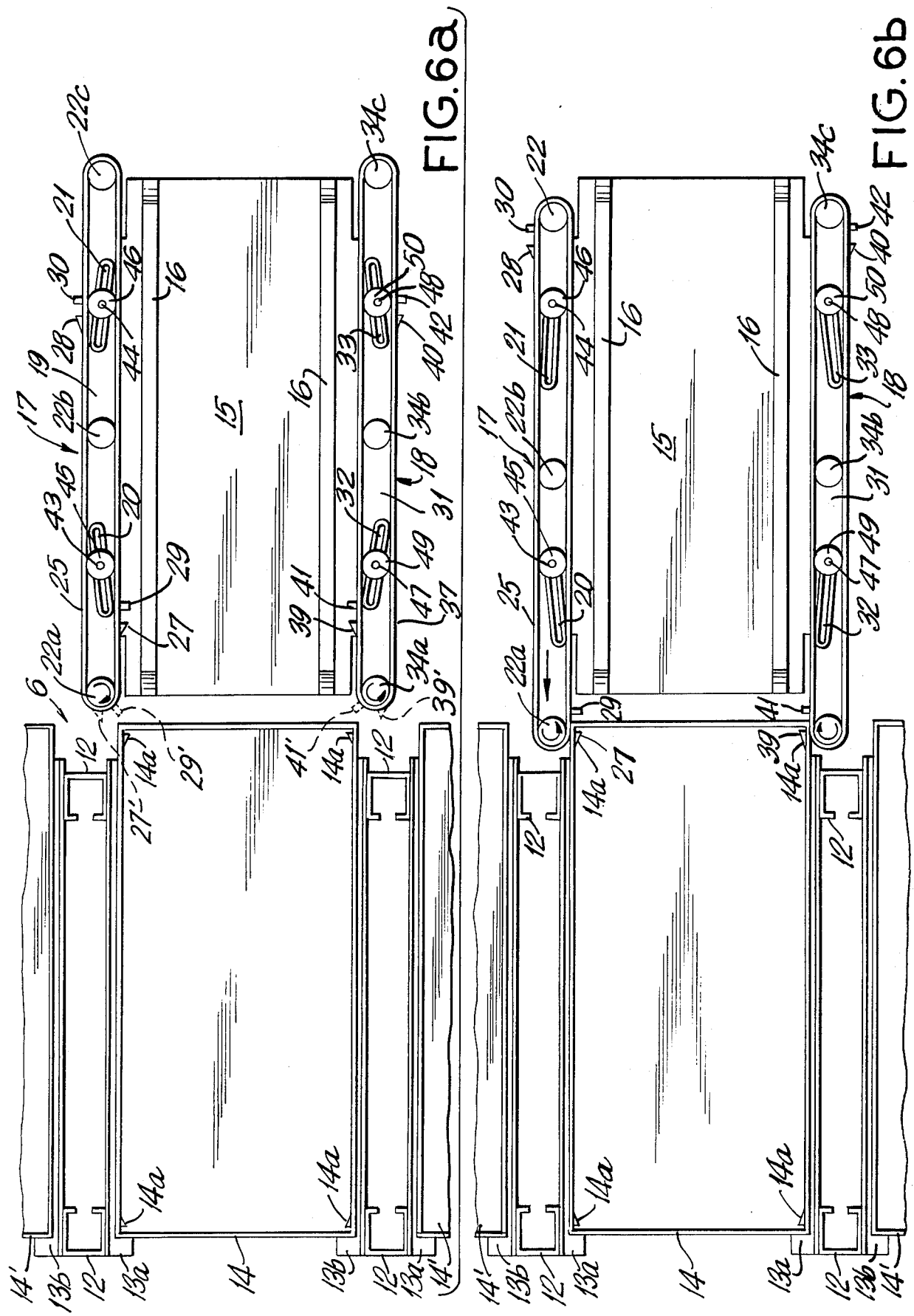

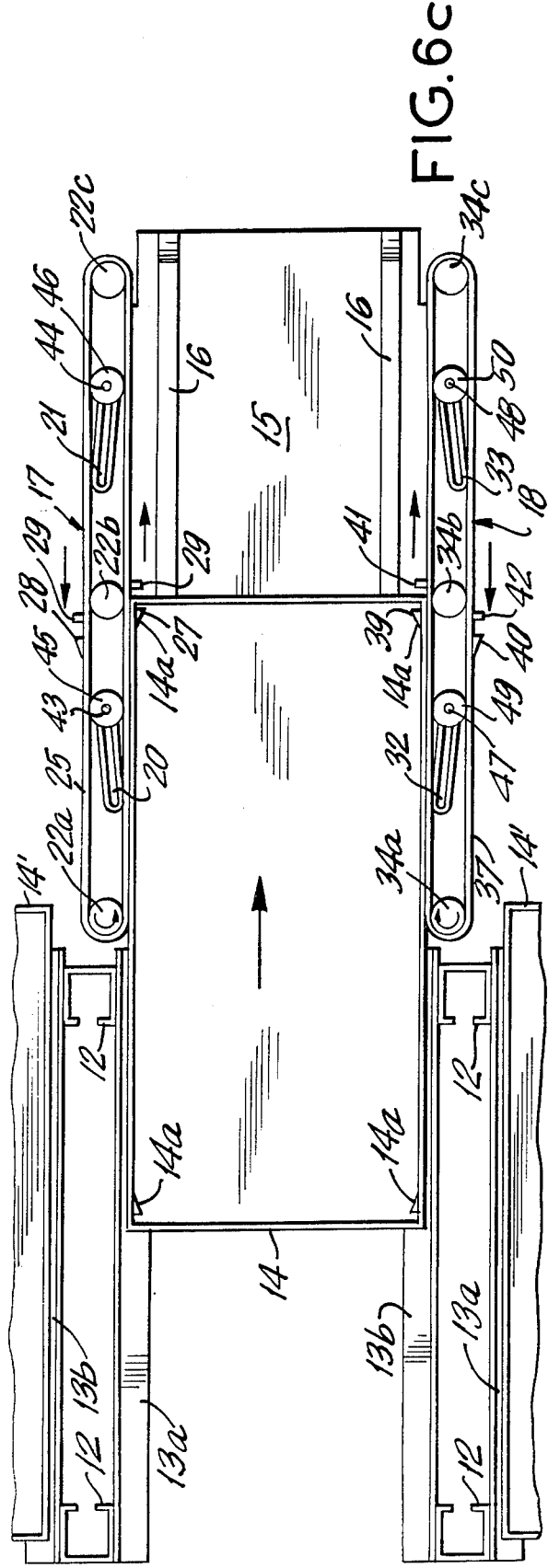
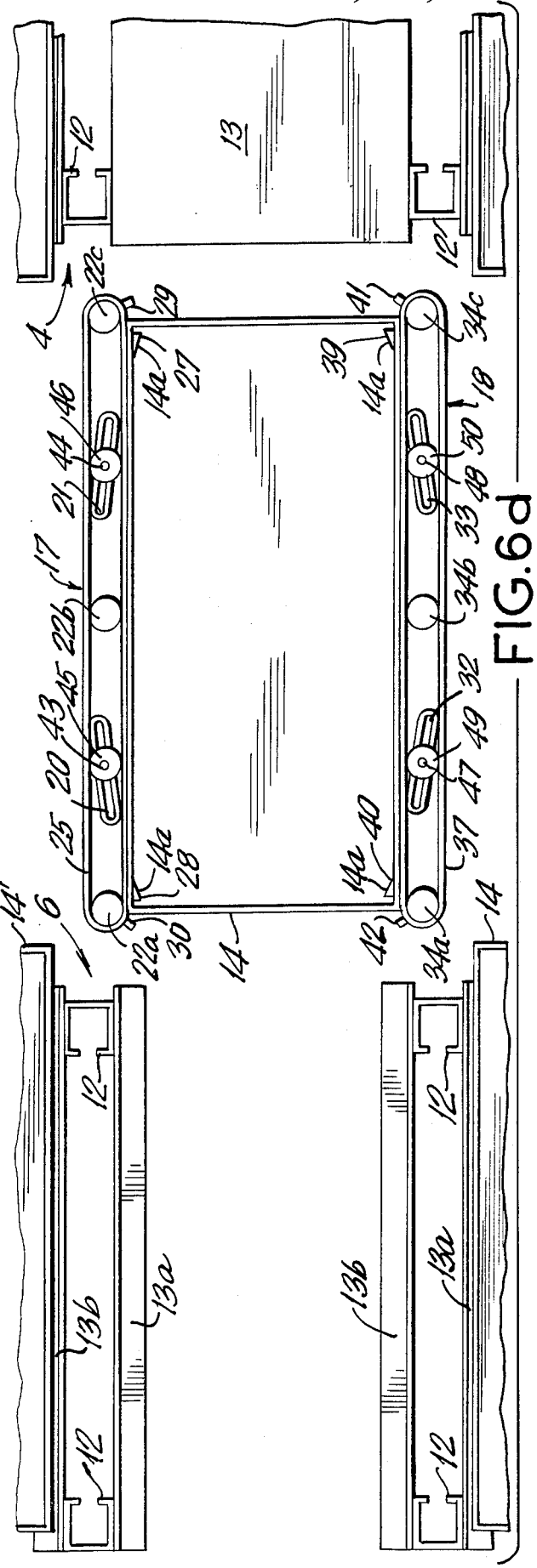

CONTAINER EXTRACTION AND TRANSFER MECHANISM FOR AN AUTOMATED STORAGE AND RETRIEVAL SYSTEM

This application is a continuation-in-part of U.S. patent application Ser. No. 063,388, filed on June 18, 1987, now abandoned.

BACKGROUND OF THE INVENTION

This invention relates to an improved container extraction and transfer mechanism for automated storage and retrieval systems, and more particularly to an extraction and transfer mechanism designed for extraction of handleless modular containers from a first selected location in a storage matrix and transfer in either lateral direction into a second selected storage location.

The environment in which the present invention is intended to operate is well-known and has been the subject of many patents, two of these being shown in U.S. Pat. Nos. 3,526,326 and 3,883,008, both being in the name of John A. Castaldi and both being assigned to the present assignee. The foregoing patents depict automated storage and retrieval systems having in common at least one matrix of storage locations for modular removable containers, tote boxes, or bins, a stacker crane assembly, which moves horizontally along an aisle in front of or between storage locations, a vertically movable platform on the stacker crane assembly, and suitable motors, position sensors, limit switches, and a selected control system to enable positioning the platform at a suitable x-y coordinate address representing a selected storage location in the storage matrix. The foregoing type of automated storage and retrieval system is known and the description relating to it as described in the foregoing Castaldi patents is incorporated herein by reference.

The present invention concerns an improved extraction and transfer mechanism which is mounted on the stacker crane platform and which will handle container extraction and transfer, once the platform is positioned at a selected location in the storage matrix.

Various types of extraction devices have been proposed in the art. The foregoing Castaldi U.S. Pat. No. 3,526,326 utilized a magnetic extractor to engage a magnetic plate attached to the end of each bin or container. This is adaptable to very light containers, and because of the space occupied by the magnet assembly on the platform, it is suitable only for extraction and subsequent replacement back in the same lateral direction from which the container was extracted.

Castaldi U.S. Pat. No. 3,883,008 illustrates a hook extractor adapted to cooperate with a special handle on the end of the container, by rotating a hook into an upright position inside the inverted L-shaped recess in the handle. The extracted container is removed onto a pair of endless belts which support the container and reduce the strain upon the hook. The success of this type of extraction system depends upon precise positioning of the handles of the modular containers residing throughout the matrix and misalignment of a particular container may result in faulty engagement of the system.

Another type of extraction system involves insertion of a lifter platform beneath a container, lifting and withdrawing it, as exemplified in U.S. Pat. No. 3,934,741 to Wentz. This system results in much lost space in the storage matrix, since vertical spacing between container supports must be provided to allow insertion of the lift or shuttle platform.

Other types of extraction mechanisms for automated storage and retrieval systems of the type described use a single pin extractor as shown and described in U.S. Pat. No. 4,556,355 issued to Michael Glater and assigned to the present assignee. Another extractor using two continuous belts, each with a single pin is shown in U.S. Pat. No. 4,361,411 to Di Liddo. Still another type of extraction mechanism using a pair of continuous loops, each with a radially inner and outer pin spaced along it is shown in U.S. Pat. No. 4,352,622 to Wieschel. These bilateral extraction systems are an improvement over the previously described systems, since they enable extraction and then transfer in either lateral direction once the container is extracted, i.e., providing for bilateral insertion of the container into the storage matrix on either side of the aisle. However, the foregoing systems still require special handles on the modular containers which must be precisely positioned in the matrix for engagement by the hooks of the extraction mechanism. And since the handles protrude on each end of a container, they reduce the usable storage space.

An extraction system for containers in sloped storage locations is shown in U.S. Pat. No. 4,563,120, which uses a lug on a continuous loop belt to engage a recess on the bottom of a handleless container.

A system for extending arms with gripper pads for gripping the sides of handleless tote boxes is shown in U.S. Pat. No. 4,492,504 to Hainsworth.

One proposal has been made in a commercially-available device for an automated storage and retrieval system which employs a pair of continuous loop chains with gripper pads for frictionally engaging the sides of a handleless container to extract the container from a storage matrix. Should the pad-type gripper in this commercially-available design become disengaged during an extraction cycle, it cannot re-engage itself without manual intervention, and reliance solely on the gripper for movement of the container could produce wear. Also for a "cross over," i.e., extraction from one lateral side and transfer to the other lateral side of the platform, the described mechanism must release, cycle to the other end of the container, re-engage and then insert the container on the other side.

Accordingly, one object of the present invention is to provide an improved extraction and transfer mechanism for an automated storage and retrieval system.

Another object of the invention is to provide an extraction and transfer mechanism for container extraction and replacement in a storage matrix, which has greater reliability and which increases usable storage space.

Another object of the invention is to provide an improved extraction and transfer mechanism for extraction and bilateral transfer of handleless containers among storage locations without need for repositioning or re-engaging the container when it is on the platform of a stacker crane.

DRAWINGS

The subject matter which is regarded as the invention is particularly pointed out and distinctly claimed in the concluding portion of the specification. The invention, however, both as to organization and the method of practice, together with further objects and advantages thereof, may best be understood by reference to the following description, taken in connection with the accompanying drawings, in which:

FIG. 1 is a perspective view of a stacker crane with portions of a storage matrix of modular containers shown on one side thereof, FIG. 1a is a reduced scale schematic plan view of the stacker crane between two storage matrices, FIG. 2 is a perspective view of a pair of hook and belt assemblies and drive means therefor in simplified schematic form, FIG. 3 is a plan view of a portion of a storage rack with modular containers and the end of one hook and belt assembly, FIG. 4 is an elevation view of the same end of the hook and belt assembly shown in FIG. 3 along with portions of the storage rack and modular containers, FIG. 5 is an exploded perspective view of one of the collapsible extraction hooks used with the present invention, FIGS. 6a through 6d are plan views illustrating successive steps in the cycle comprising: (a) positioning the platform, (b) engagement of hooks, (c) belt and hook container extraction, and (d) hook engagement in position for bilateral transfer, and FIGS. 7 and 8 are simplified plan views showing alternate forms of the cam guiding slots.

SUMMARY OF THE INVENTION

Briefly stated, the invention is practiced by providing an improved container extraction and transfer mechanism for an automated storage and retrieval system of the type having at least one storage matrix of vertically and horizontally spaced storage openings adapted to hold the plurality of modular containers of substantially uniform width, the system also including a horizontally movable stacker crane with a vertically movable platform and arranged to position a transfer shelf in alignment with a selected container. The improved extraction and transfer mechanism comprises a pair of laterally extending, horizontally spaced hook and belt assemblies mounted for lateral movement on the platform of the stacker crane and disposed on either side of the transfer shelf. Each hook and belt assembly comprises a continuous loop friction belt and at least a first collapsible hook connected to travel substantially parallel to the path of the belt, first reversible drive means connected to move the belt assemblies laterally on the platform toward the matrix so as to grasp the end of a selected modular container, and second reversible drive means connected to rotate the belt and hook assemblies so as to hook and to extract the containers onto the transfer shelf. Converging movement of the belt assemblies may be provided by cam surfaces during lateral movement of the assemblies. A second collapsible hook on each assembly engages the opposite end of the container, positioning it for bilateral transfer.

DESCRIPTION OF THE PREFERRED EMBODIMENT

Figure 1:
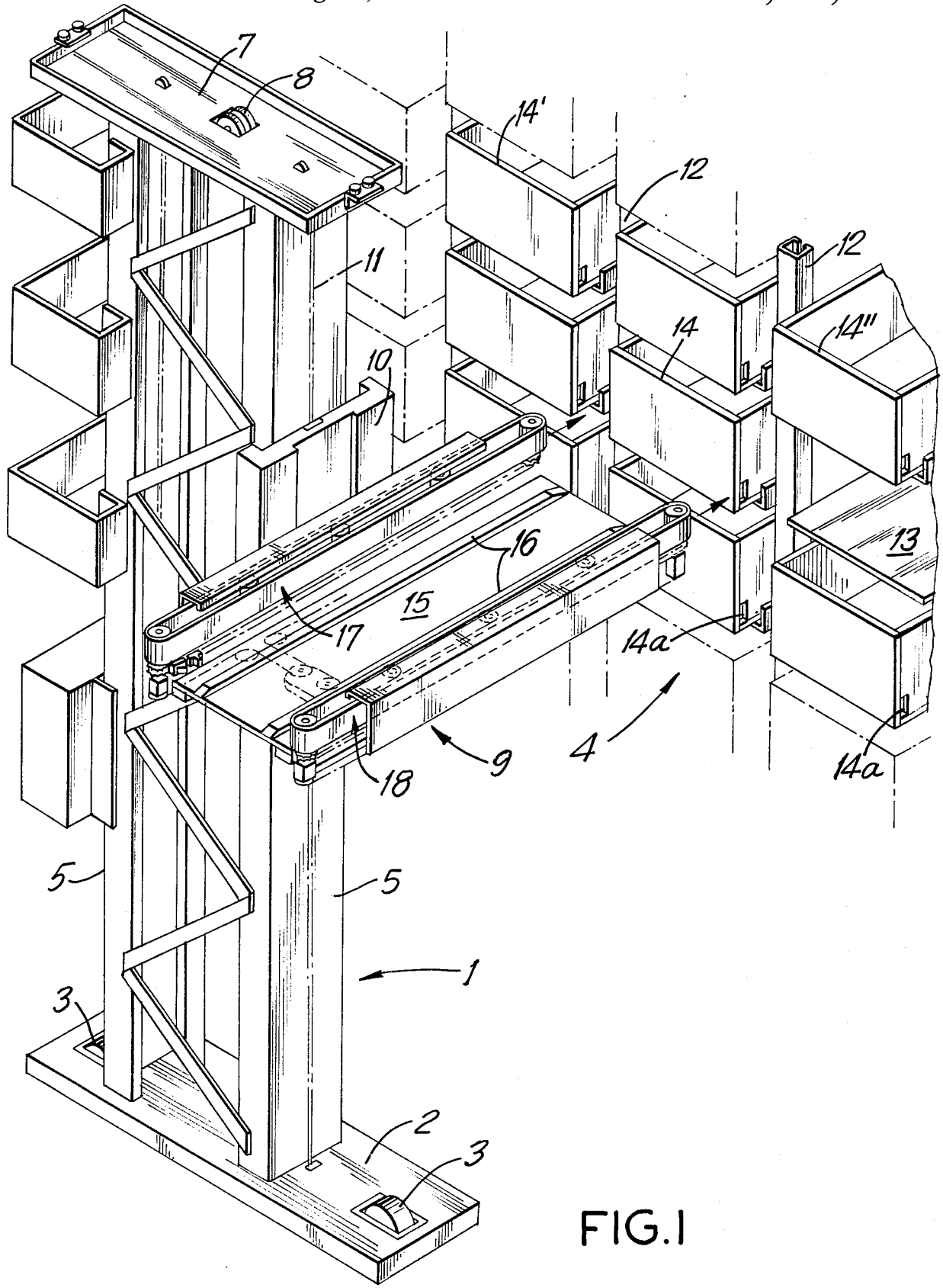

Referring now to FIG. 1 of the drawing, a stacker crane shown generally by reference numeral 1 includes a base 2 mounted on wheels 3 to make it horizontally movable along an aisle in front of a first matrix of storage compartments, part of which is indicated generally at 4. The construction of the stacker crane 1 is not material to the present invention, but it is shown here as including a pair of vertical masts 5 connected by an upper plate 7 with flanged wheel 8 for guiding along a support rail (not shown). The stacker crane includes a vertically movable cantilever platform, indicated generally by reference number 9 comprising a lift carriage 10 riding on vertical tracks attached to the front mast, with suitable hoist and lower mechanism such as a cable or chain 11 and drive mechanism (not shown). A suitable computer or microprocessor operated control system of a type known in the art is arranged to send data concerning a desired address or location in the storage matrix 4, and to operate the horizontal propelling drive of the stacker crane 1 and the chain drive 11 for raising or lowering the lift carriage 10 and the vertically movable platform 9 so as to position the platform at any selected location in the storage matrix 4. The precise control system and computer hardware and software for accomplishing this is not a part of the present invention. All sensors, microprocessors and related hardware are commercially available. Reference to the aforementioned Castaldi patents will disclose one type of suitable automated storage and retrieval system for positioning the platform 9, but others are also known.

The storage matrix 4 shown in FIG. 1 comprises a large number of vertically and horizontally spaced storage openings. These are defined by a steel framework consisting of vertical columns 12 and connecting horizontal shelves 13. Each of the storage locations is of the proper size to hold modular containers 14, 14', 14", etc. All of the modular containers are of substantially the same width, open on the top and in the preferred embodiment have no protruding handles on the ends, or at least no handles of the type used in the prior art to extract such containers from the storage locations. Each container 14 is provided with hook-engageable recesses or indentations 14a on its sides.

Figure 1A:
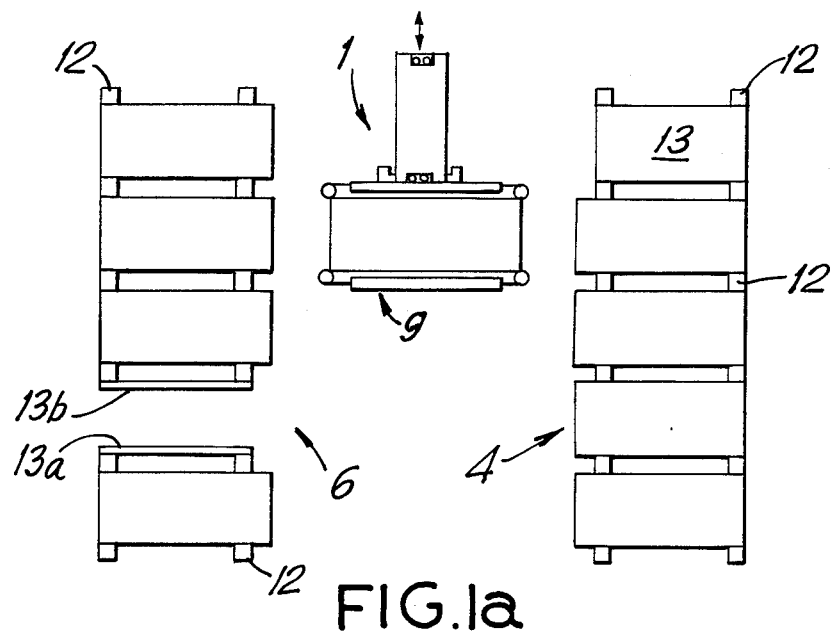

Although the invention is useful with a single storage matrix 4 on one side of the crane 1, it is most useful in a multimatrix system with the stacker crane traveling in an aisle between two matrices. This is indicated in FIG. 1a of the drawing showing crane 1 with platform 2 traveling between storage matrices 4 and 6.

Although the framework illustrated in FIG. 1 shows the columns 12 to be connected by shelves 13 which also provide structural support, a pair of channel members may be substituted for a shelf. Columns 12 may be free standing and supported at top and bottom. This is indicated in FIG. 1a where matrix 6 uses channels 13a, 13b attached to posts 12, while matrix 4 uses shelves 13.

Referring back to FIG. 1 of the drawing, platform 9 includes a transfer shelf 15 which extends generally in the lateral direction or perpendicular to the front of the storage matrix 4. Transfer shelf 15 is provided with a pair of low friction Teflon glides 16 for reducing friction when sliding a selected container 14 onto and off of transfer shelf 15. When the microprocessor control system positions the platform at a selected storage location, the transfer shelf 15 and glides 16 are positioned just below and centered on the selected or addressed container. Arranged on either side of transfer shelf 15 and extending in a lateral direction are a pair of horizontally spaced continuous loop hook and belt assemblies 17, 18 and the associated drive mechanisms (not fully shown) which form the subject of the present invention.

Figure 2:
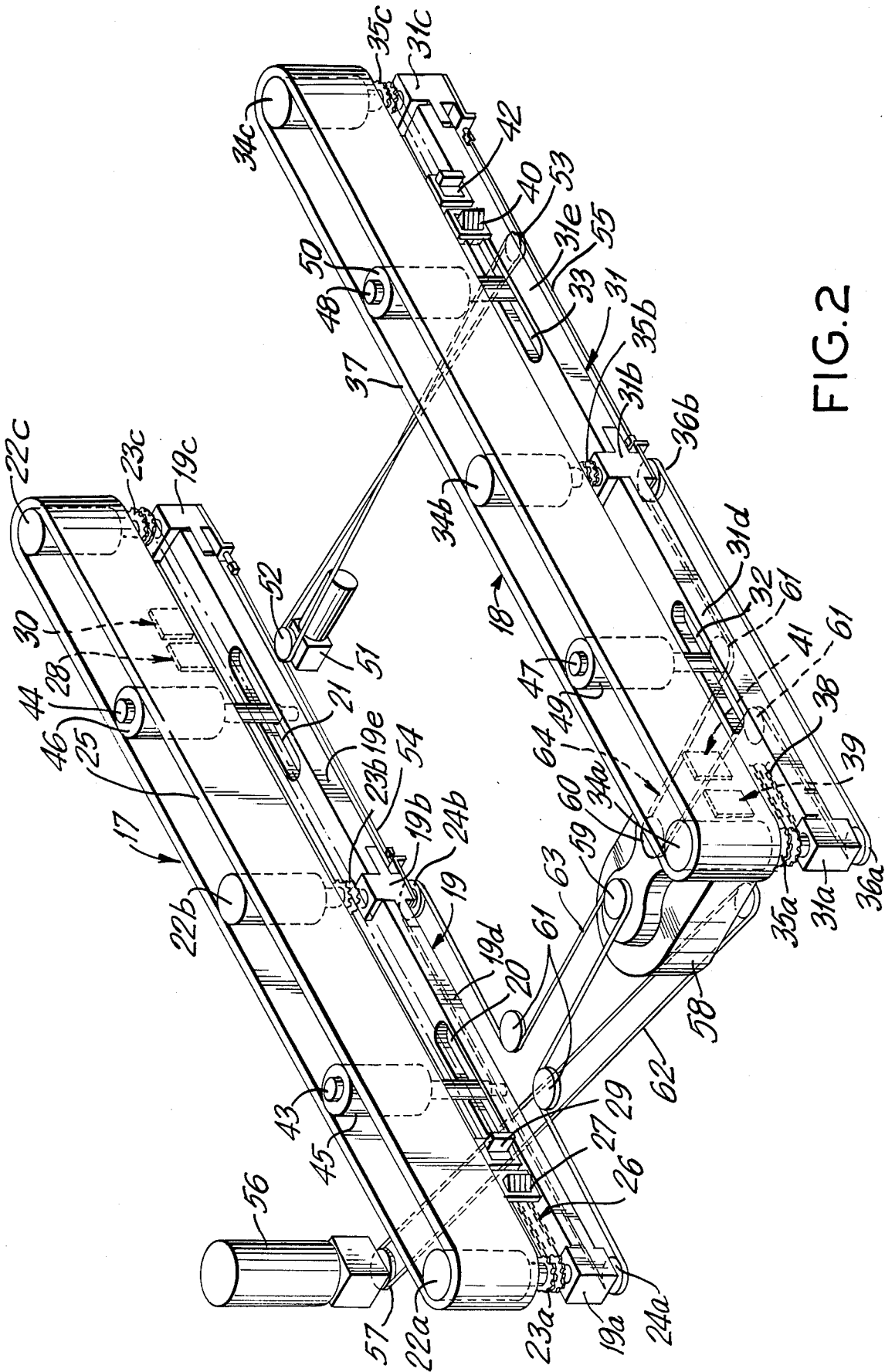

Referring now to FIG. 2 of the drawing, each of the pair of hook and belt assemblies 17, 18 are substantially identical, except that one is essentially constructed and assembled to be a mirror image of the other. Assembly 17 comprises a lateral slide bar shown generally at 19 made up of three bearing blocks 19a, 19b, 19c connected and spaced by lateral spacer members 19d, 19e. The lateral spacer members 19d, 19e include elongated lateral slots 20, 21 respectively which are slightly skewed in an opposite sense with respect to the lateral axis (See also FIGS. 6a through 6d). Rotatably mounted in each of the bearing blocks 19a, 19b, 19c are shafts on which are mounted friction belt drive rollers 22a, 22b, 22c, respectively and chain drive sprockets 23a, 23b, 23c, respectively. Shaft ends extending below bearing blocks 19a, 19b are mounted with belt and hook drive chain sprockets 24a, 24b.

In order to provide a friction surface for frictionally engaging the sides of a selected modular container, a continuous loop friction belt 25 is disposed around the belt drive rollers 22a through 22c. In order to provide a drive for the hook assemblies, a continuous chain loop indicated at 26 is engaged around the sprockets 23a through 23c. Connected to the chain 26 approximately one container length apart are a first extraction hook 27 and a second extraction hook 28 which are spring loaded and collapsible. Also connected to the continuous chain loop 26 is a first follower block assembly 29 and a similar second follower block assembly 30. The follower blocks are not collapsible and are connected on the outer sides of hooks 27, 28 so as to be spaced apart by slightly more than a container length.

The other hook and belt assembly 18 is constructed in the same manner, but will only be described briefly. It includes lateral slide bar 31, bearing blocks 31a through 31c, lateral spacers 31d, 31e, lateral slots 32, 33, belt drive rollers 34a through 34c, chain drive sprockets 35a through 35c, and belt and hook drive chain sprockets 36a, 36b. There is a continuous loop friction belt 37, continuous loop chain 38, first extraction hook 39, second extraction hook 40, and follower block assemblies 41, 42.

A number of elements are mounted so as to be stationary on the platform to act as idlers for the continuous loops and to function as cam followers for guidance of the belt assemblies 17, 18. On belt assembly 17, these elements are as follows. A pair of stationary shafts 43, 44 have belt idler rollers 45, 46 rotatably mounted on them. Shafts 43, 44 extend through the respective skewed lateral slots 20, 21 in the lateral slide bar 19 and are securely attached to the platform at their lower ends by means (not shown). Similarly, for belt assembly 18, there are like stationary shafts 47, 48 with belt idler rollers 49, 50 rotatably mounted on them and whose lower ends extend through lateral slots 32, 33 in lateral slide bar 31 and are secured at the lower end. Cooperative action between shafts 43, 44, 47 and 48 acting as cam followers and slots 20, 21, 32 and 33 acting as cam surfaces guide the assemblies 17, 18 when they move laterally.

A first reversible drive gear motor 51 provides the means to move or to translate the two assemblies 17, 18 bilaterally or in either lateral direction according to direction of rotation of the motor 51. A double drive sprocket 52 beneath assembly 17 is driven by the reversible drive motor and a double idler sprocket 53 is mounted to the platform beneath the other assembly 18. A first chain 54 is connected in a "Z" configuration from an anchor point on bearing block 19b, around drive sprocket 52, idler sprocket 53 to an anchor point on bearing block 31c. Similarly, an oppositely running "Z" configuration chain 55 is connected between an anchor point on bearing block 31b around idler sprocket 53, drive sprocket 52 to an anchor point on bearing block 19c. Therefore, operation of motor 51 in one direction will move both hook and belt assemblies 17, 18 in one lateral direction on the platform, and reversing the motor 51 will move the two assemblies in the opposite lateral direction. Use of the double "Z" chain path provides simultaneous and synchronous movement of the two assemblies 17, 18.

A second reversible drive means is provided to rotate both of the continuous loops of the hook and belt assemblies in counter-rotational directions. This comprises a reversible gear box drive motor 56 with drive sprocket 57, and a parallel drive gear box 58 with counter-rotating drive sprockets 59, 60 and suitable idler sprockets designated by reference number 61. A chain 62 is connected to drive sprocket 57 to operate the gear box 58. A second chain 63 drives sprockets 24a, 24b of the assembly 17, and a third belt or chain 64 drives the sprockets 36a, 36b of assembly 18. The second and third chains run perpendicular to the belt assemblies from gear box drive sprockets 59, 60 and around idler sprockets 61. This permits the belt assemblies to move laterally while maintaining proper chain tension. Operating reversible gear motor 56 in one direction or the other, therefore, acts a second reversible drive means to rotate the continuous belt and hook drive chains either in one direction or the other, the continuous loops of the two assemblies operating in counter-rotational directions.

While the first and second reversible drive means are connected to move the belt assemblies and to rotate the belt assemblies respectively through chain drives, obviously belt drives could be substituted in some applications.

Figure 3:
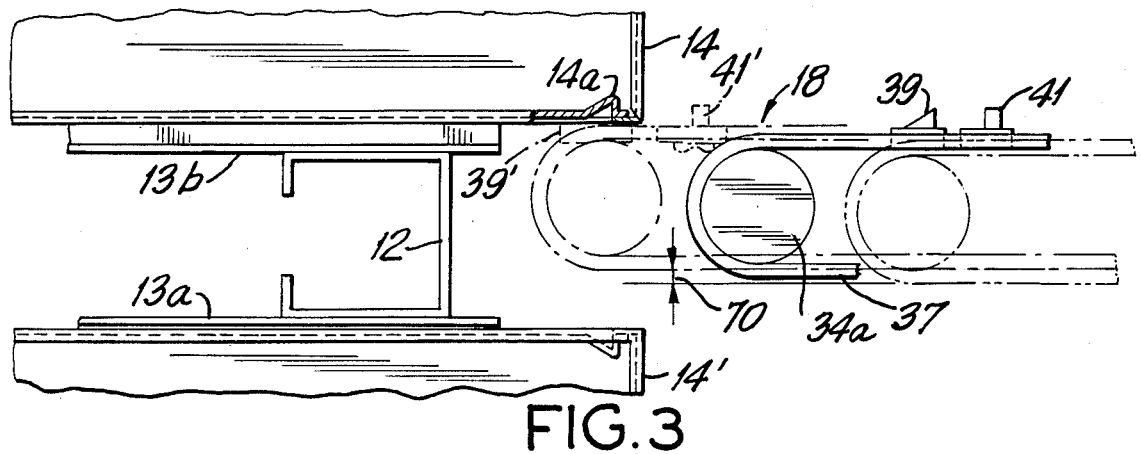
Figure 4:
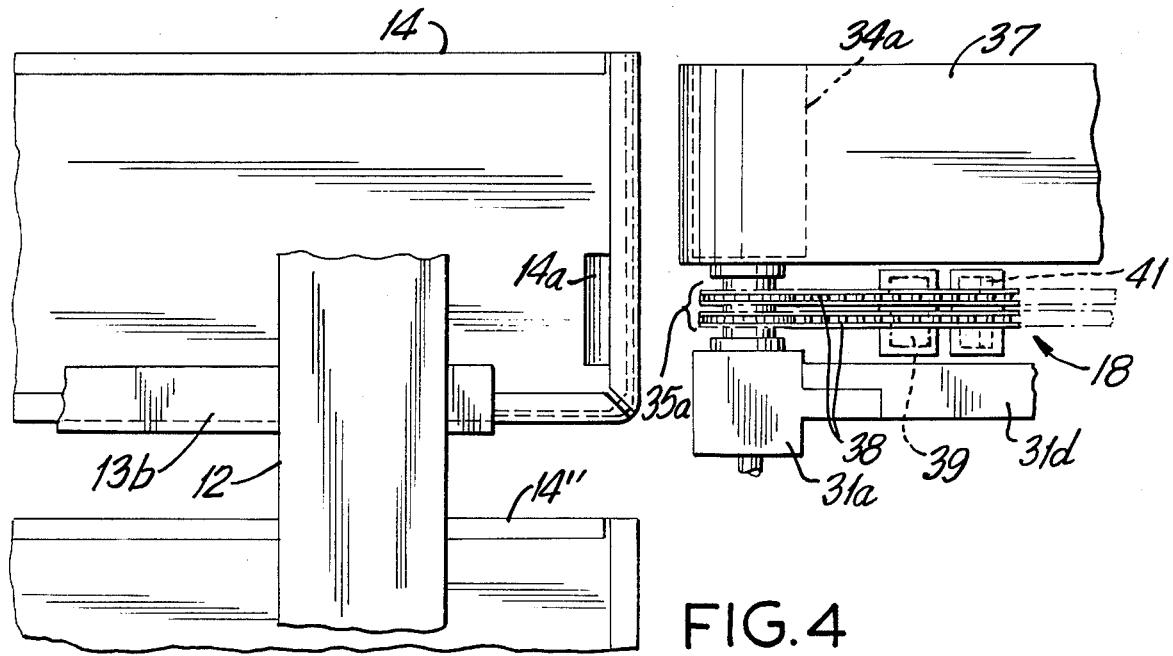

Referring to FIGS. 3 and 4 of the drawing, the interface and manner of engagement of a belt and hook assembly with the side of a container is indicated in simplified schematic form. Each of the modular containers 14 includes four hook engagement recesses, one of which is indicated at 14a in FIGS. 3 and 4. Recesses 14a are located on both sides of opposite ends of the containers 14 and may be formed by suitable inclined indentations in the side of the container. Where the containers are intended to hold large objects which will not be lost, openings or slots punched in the sides of the containers may alternatively serve as the hook engaging recesses. As indicated in FIG. 3, each of the containers is horizontally spaced from its neighboring containers, one of which is indicated by reference number 14', by one or more vertical posts 12. As shown in FIG. 4, each container is arranged to be supported on shelf angle supports 13a, 13b and is vertically spaced from its underlying and/or overlying neighboring modular container 14". A portion of the end of hook and belt assembly 18 is shown laterally spaced from the end of the selected container 14. FIG. 3 in plan view illustrates the bilateral movement of the belt assembly 18 from its starting position indicating by the right hand phantom lines to its hooking position indicated by the left hand phantom lines. FIG. 4 illustrates the proper vertical alignment of assembly 18 with respect to modular container 14 for initiating the extraction cycle. In this case the extraction hook assembly 39 and the follower block assembly 41 are located on the inboard side of the belt. In FIG. 3, the hook and follower members, 28, 30 are shown in phantom line as reference numbers 39' and 41' after they have been moved left to hooking engaged position.

Figure 5:
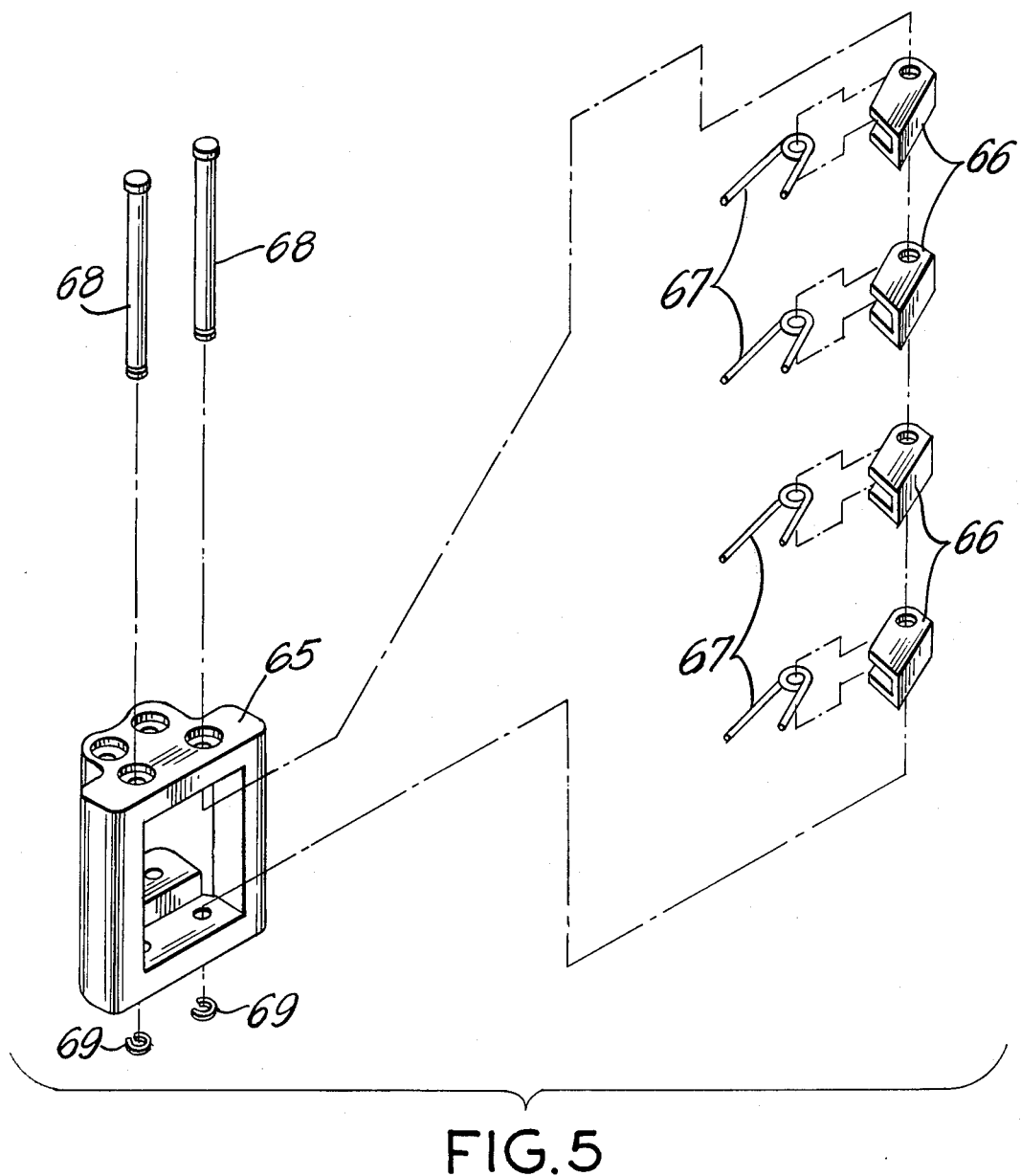

Referring now to FIG. 5 of the drawing, a suitable construction is shown for the collapsible hook. Each hook comprises a housing 65, a plurality of pivotable hooks elements 66, associated springs 67, and a pair of pins 68 held by retaining ring 69. The design is symmetrical such that the hook elements 66 can be assembled to form either a right hand extraction hook or a left hand extraction hook. One of the pins 68 is assembled to serve as a stop for one end of the spring 67. The other pin is successively inserted through each hook element 66, also passing through the hole in spring 67 which fits inside the hook element as will be obvious from the drawing. Thus the separate hook elements are spring biased and collapse when passing over a surface in one direction, but serve to hook against the sides of recesses 14a when passing in the other direction. As indicated in the drawings, the hooks are mounted on the drive chain facing one another so as to function in a bilateral manner, and are spaced from one another by the distance between the hook engaging recesses 14a on a modular container.

FIGS. 6a through 6d of the drawing illustrate the successive steps in extraction of a selected modular container 14 from a storage location in the storage matrix and transfer of the container to a transfer shelf on the platform. From there, the container is positioned for relocation by the stacker crane and transfer in either lateral direction.

Referring first to FIG. 6a of the drawing, the matrix frame posts 12 support channel members 13a, 13b on either side thereof, these in turn supporting the selected modular container 14 and additional modular containers 14'. Only the main elements of the extraction and transfer mechanism are shown, together with only those fixed members of the platform which are necessary for an understanding of operation of the invention, the remaining elements being omitted for purposes of clarity. The elements shown in FIG. 6a which are fixed, i.e., secured to the stacker crane platform are the transfer shelf 15 with friction reducing Teflon glide support 16, and the shafts 43, 44, 47 and 48 with their idler rollers 45, 46, 49 and 50. As previously described with FIG. 2, the reversible lateral drive motor will cause the continuous loop belt assemblies 17, 18 to move or translate in either lateral direction, toward either the left hand storage matrix, 6 or toward the right hand storage matrix 4. The lateral slots, 20, 21, 32, 33 are slightly skewed on the lateral slide bars 19, 31 which causes them to act as cam surfaces for the fixed shafts of 43, 44, 47, 48 which act as cam followers. This causes a slight converging or pinching movement of continuous loop assemblies 17, 18 on the side towards which the assemblies are moving, and a slight diverging or widening of the assemblies 18 on the opposite lateral end of the platform. For example, if assemblies 17, 18 are moved toward the left, shafts 43, 47 traveling along slots 20, 32 gradually force the bearing blocks carrying the belt rollers 22a, 34a toward one another and towards the sides of container 14. At the same time, travel of shaft 44, 48 along slots 21, 33 gradually cause the right hand end of assemblies 17, 18 to widen. By referring back to FIG. 3 of the drawing, the gradual converging motion of belt drive roller 34a can be seen. The extent of this converging motion toward the side of container 14 by one assembly 18 is indicated by the dimension lines at reference number 70. The same degree of convergence takes place by the other belt assembly 17 (not shown in FIG. 3) on the opposite side of container 14.

OPERATION

Operation of the extraction and transfer cycle is seen by reference to FIGS. 6a through 6d showing successive stages of the cycle.

FIG. 6a shows the stacker crane and platform in position, the automatic storage and retrieval system having positioned the transfer shelf 15 in laterally spaced alignment with the bottom of a selected container 14 and with the continuous loop belt assemblies 17, 18 centered on either side of the container. Referring to FIG. 6a of the drawing, the first stage of the cycle is to operate the gear drive motor 56 with chains and gear box (second reversible drive means shown in FIG. 2) so as to rotate the belt and hook assemblies in a first counter-rotational direction as indicated by the arrows. This will position hook assemblies for extraction as shown by phantom lines and reference numerals 27', 39'. The next stage of extraction (FIG. 6b) commences when operation of the lateral drive motor 51 with double "Z" chains and sprockets (first reversible drive means shown in FIG. 2) moves or translates the assemblies 17, 18 laterally to the left toward shelves 13. The cam action of slots 20, 21, 32, 33 also causes the friction belt rollers 22a, 34a to converge toward sides of container 14. Minor side-to-side misalignment of a container is corrected by this converging movement, which is one of the advantages of the present improved extraction and transfer mechanism.

As contact is made with the container 14, the second reversible drive means is reversed and the collapsible hook assemblies 27, 39 begin to rotate in the extraction direction and toward container 14 where they enter dimpled recesses 14a (see FIG. 6b). Since there are four separately movable spring loaded hook elements 66 in each hook (see FIGS. 4 and 5), slight vertical misalignment of the stacker crane platform with respect to the container will not defeat the hooking action. Only one of the four hook elements need engage on either side for a successful extraction.

After contact is made with the container, the belt assemblies continue to move toward the shelves 13, while the movement of the friction belts adjacent the container is away from the shelves 13 as indicated by the arrows in FIG. 6 (b). Therefore, the rotation of the friction belts tending to move the container toward the right is such as to counteract the motion of the belt assemblies toward the left, allowing the belts to envelope or grasp the container without pushing on it.

In FIG. 6 (c) the belt assemblies are no longer moving toward the container, but the belt rotation continues as indicated by the arrows. The extraction is initiated by the hooks 27, 39 moving toward the right. As the container moves, the friction belts 25, 37 successively engage more and more side surface area of the containers, so that the friction belts, as well as the engaged hooks, distribute the strain of an extraction movement over several different members, but primarily on the belts 25, 37. These belts are relatively inexpensive and easy to replace.

As the container is pulled toward the right onto transfer shelf 15, the friction-reducing glides 16 further reduce the effort of the extraction. The pressure applied to the container sides by the converged movement of the rollers 22a, 34a provides sufficient friction for the belts to effectively move container 14 to the center of the transfer shelf 15. As the continuous loops continue their counter-rotation, they carry the second extraction hooks 28, 40 into position where they engage with the left hand container recesses 14a.

After hooks 28, 40 engage or even before they engage, the first reversible drive means is reversed to move or translate the two belt assemblies 17, 18 to the right so that the belt assemblies with container nestled between them return to the centered position on the stacker crane platform. As they do so, the cam action of the lateral slots 20, 21, 32, 33 cause the left hand ends of the belt assemblies to diverge and the right hand ends to converge so that the belt assemblies end up parallel to one another and centered on the platform. This final position is shown on FIG. 6d of the drawing.

The important thing to note is that the container 14 now is properly positioned for bilateral transfer either into an empty storage location in the right hand matrix 4 or into an empty storage location in the left hand matrix 6 without further repositioning of container or operation of the extraction mechanism. Both of the collapsible hooks 39, 27 on the right hand side and 28, 40 on the left hand side are engaged. The follower block assemblies 29, 30, 41, 42 are positioned on the outside of the container on either end to assist the belt by pushing the container into either the left hand or right hand matrix storage location in accordance with selected direction of rotation of the first reversible drive means.

Figure 7:
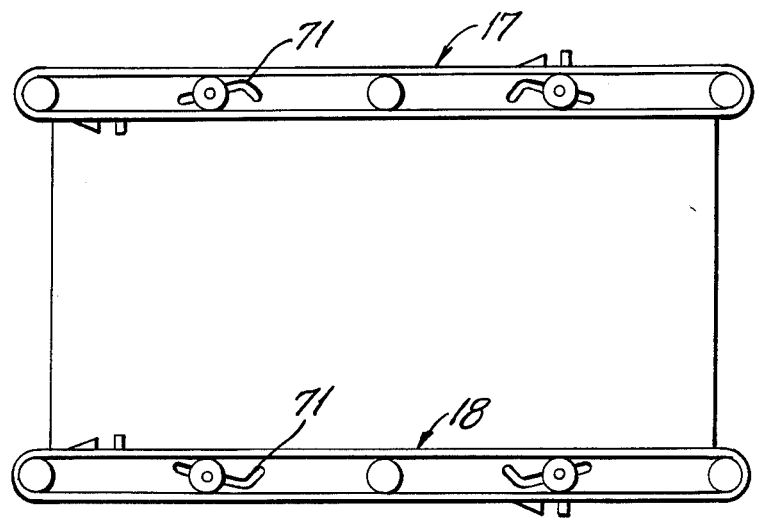
Figure 8:
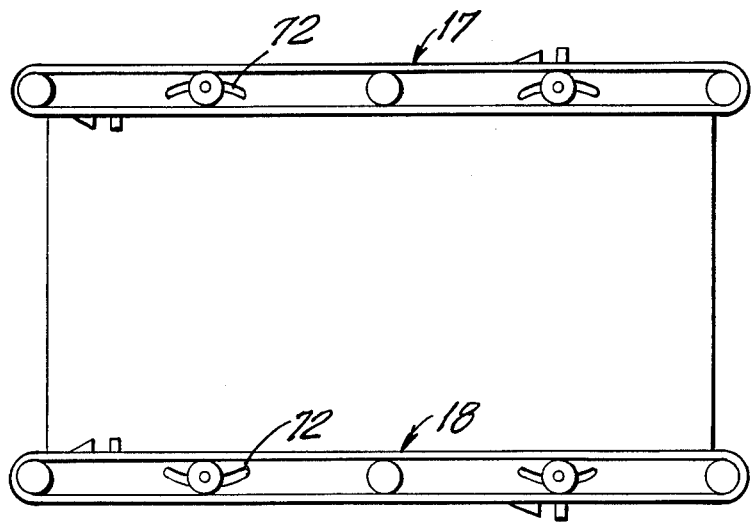

FIGS. 7 and 8 show that alternate types of converging or diverging movement of the belt assemblies 17, 18 can be provided by suitable design of the cam slots in the lateral slide bars. FIG. 7 shows angled slots 71 which will cause the rollers to diverge in the initial stage of lateral movement and then converge near the end of the lateral movement. This cam arrangement may be suitable in systems where there is possibility of extreme container misalignment.

By providing curved or arcuate slots 72 as shown in FIG. 8, the belt assemblies 17, 18 may be caused to converge in a parallel manner when translated in either bilateral direction as indicated by the phantom lines.

Other advantages of the invention are as follows:

The use of side extraction eliminates the need for space-consuming protruding handles on the both ends of the containers which are used for extraction in most systems today. Current extraction systems also need more space for clearance of the mechanism to function with the bottom row of containers. Elimination of handles provides a storage matrix requiring vertical clearance of one inch or less, greatly increasing usable space. The extraction assemblies utilize the spacing provided by the storage rack posts, which are a necessary part of the storage matrix.

Elimination of handles also saves cost in manufacture of the containers, which provides substantial savings. In the preferred container illustrated in the drawings, the recessed dimple is formed at the same time as the sides of the container are punched.

Increased reliability of the extraction mechanism results from the use of friction belts operating in combination with engaged hooks giving greater life and less chance of a container becoming disengaged.

Converging movement of the belt assemblies aids in correcting misaligned containers, which is the single most common cause of jams and/or missed extractions.

The system is adaptable also to tapered or stackable containers by slight modification to taper the friction surface of the belts.

While there has been disclosed what is considered to be the preferred embodiment of the invention, other modifications will occur to those skilled in the art. It is desired to secure in the appended claims all such modifications as fall within the true spirit and scope of the invention.

I claim:

1. An improved container extraction and transfer mechanism for an automated storage and retrieval system of the type having at least one storage matrix of vertically and horizontally spaced storage openings adapted to hold a plurality of modular containers of substantially uniform width, each container defining hook engagement recesses in the ends thereof on the opposite sides thereof, said system also including a horizontally movable stacker crane with a vertically movable platform and a transfer shelf thereon, said crane arranged to position said transfer shelf in laterally spaced alignment with the bottom of a selected one of said containers, said improved container extraction and transfer mechanism comprising:

a pair of laterally extending, horizontally spaced hook and belt assemblies mounted for lateral movement on said platform and disposed on either side of said transfer shelf, each said assembly comprising a continuous loop friction belt and at least a first hook connected to travel substantially parallel to the path of said belt and vertically aligned with one of said container hook engagement recesses when said transfer shelf is so positioned, first reversible drive means connected to move said assemblies laterally on said platform so as to grasp the end of a selected modular container with said friction belts engaging opposite sides of said containers, and second reversible drive means connected to rotate said belt and hook assemblies to cause said first hooks to engage in said hook engageable recesses for extracting said selected container from said storage matrix onto said transfer shelf with the first hooks engaged in said container recesses and the friction belts engaged with the sides of said containers.

2. The combination according to claim 1, wherein said first hooks comprise spring loaded collapsible hook elements, whereby rotation of said second reversible drive means in first counter-rotational directions will position said first hooks for extraction and whereby rotation in second counter-rotational directions will initiate engagement of said first hooks and extraction of said container.

3. Improved container extraction and transfer mechanism in accordance with claim 1, wherein each said assembly includes at least a second hook connected to travel substantially parallel to the path of said belt and spaced from said first hook so as to be engageable in a hook engagement recess on the opposite end of one of said modular containers when the first hook is engaged, whereby the second reversible drive means causes the first and second hooks to become simultaneously engaged on opposite ends of one of said containers when it is extracted.

4. Improved container extraction and transfer mechanism according to claim 1, and further including cam means operatively connected between each of said hook and belt assemblies and said platform and arranged to cause converging movement of said hook and belt assemblies toward one another near the end of lateral movement of said hook and belt assemblies by the first reversible drive means.

5. Improved container extraction and transfer mechanism according to claim 1, wherein said first hook comprises a plurality of spring loaded hook elements.

6. Improved container extraction and transfer mechanism according to claim 1, wherein each said assembly further includes a continuous loop chain, said continuous loop chain and said continuous friction belt being driven together by said second reversible drive means, said first hook being mounted on said continuous loop chain.

7. The combination according to claim 6, and further including a second hook mounted on said continuous loop chain each of said first and second hooks having spring loaded collapsible hook elements facing in opposite directions, said first and second hooks being spaced along said chain so as to be successively engageable with said hook engagement recesses in opposite ends of a container selected for extraction.

8. The combination according to claim 7, wherein said assembly further includes first and second follower assemblies mounted on said continuous loop chain symmetrically with respect to first and second hooks and on the outside thereof so as to be located beyond the respective opposite ends of a container selected for extraction, whereby said follower assemblies may assist the friction belt in inserting a container.

9. An improved container extraction and transfer mechanism for an automated storage and retrieval system of the type having at least one storage matrix of vertically and horizontally spaced storage openings adapted to hold a plurality of modular containers of substantially uniform width, each container defining hook engagement recesses in the ends thereof on the opposite sides thereof, said system also including a horizontally movable stacker crane with a vertically movable platform and a transfer shelf thereon, said crane arranged to position said transfer shelf in laterally spaced alignment with the bottom of a selected one of said containers, said improved container extraction and transfer mechanism comprising:

a pair of laterally extending, horizontally spaced hook and belt assemblies mounted for lateral movement on said platform and disposed on either side of said transfer shelf, each said assembly comprising a lateral slide bar mounted for lateral movement on said platform, a plurality of rotatably mounted drive members mounted along said lateral slide bar, a plurality of rotatably mounted idler members mounted on said platform, a friction belt, and a chain, said friction belt and said chain forming continuous loops extending around said drive members and said idler members, and first and second collapsible hooks connected to said chain, said first and second hooks being spaced on said chain by the distance between said hook engaging recesses at opposite ends of a container, first reversible drive means connected to move said hook and belt assemblies laterally on said platform so as to grasp the end of a selected modular container, with said friction belts engaging opposite sides of said containers, and second reversible drive means connected to said drive members so as to rotate said belt and chain in first counter-rotational directions with respect to one another to position said first collapsible hooks for engagement in said container recesses and in second counter-rotational directions with respect to one another for engaging said first collapsible hooks and for extracting said selected containers from said storage matrix onto said transfer shelf with said second collapsible hooks to be engaged in said container recesses at the opposite ends of said containers.

10. The combination according to claim 9, including cam follower means mounted on said platform and wherein said lateral slide bars are arranged to cooperate with said cam follower means to cause said hook and belt assemblies to converge toward one another on the ends thereof toward the direction of lateral movement of said assemblies.

11. The combination according to claim 10, wherein said idler members are mounted on shafts and wherein said shafts comprise said cam follower means and wherein said lateral slide bars define slots enclosing said shafts and providing cam guiding surfaces skewed with respect to a lateral direction to cause said hook and belt assemblies to converge on the ends thereof when lateral movement takes place.

* * * * *